INVENTOR.
Rexford H. Osborn
Max C. Yost

3,235,183
ABLATION COOLED ROCKET NOZZLE

Rexford H. Osborn, San Jose, and Max C. Yost, Granada Hills, Calif., assignors to United Aircraft Corporation, East Hartford, Conn., a corporation of Delaware
Substituted for abandoned application Ser. No. 90,460, Feb. 20, 1961. This application May 29, 1963, Ser. No. 284,230
2 Claims. (Cl. 239—265.15)

This application is a substitute for previously abandoned patent application S.N. 90,460 entitled "Ablative Throat Rocket" by Rexford H. Osborn and Max C. Yost in which U.S. Patent 2,206,057, British Patent 757,890, and "Astrolite," Products Bulletin No. PB 7-24A, pages 1-4 were made of record.

This invention relates to a rocket nozzle and, more particularly, to a rocket nozzle comprised of ablative material having a throat diameter of substantially uniform cross-section for the duration of a rocket firing.

In the past, ablation-cooled rocket nozzles have been employed for use in rocket motor systems and, in particular, in combination with ablative thrust chambers. However, it was found that ablatively cooled rocket nozzles made with conventional nozzle geometry would undergo radical change in throat diameter as the firing progressed because the constricted throat section would ablate away enlarging the throat cross section. Since the thrust of a rocket engine varies according to the combustion chamber pressure and the area of the nozzle throat, the variation in the throat area of an ablation-cooled nozzle during firing produces erratic motor performance. Consequently, the practice in the past has been to use non-ablative materials in the throat portion so that this area does not alter during firing.

The present invention, however, avoids the foregoing problem in ablation-cooled rocket nozzles by employing a throat portion made up of ablative materials possessing a substantially constant cross section extending longitudinally for a predetermined distance along the nozzle axis.

It is an object, therefore, of the present invention to provide an ablation-cooled rocket nozzle wherein the throat diameter does not change in the course of the rocket firing.

The specific nature of the invention, as well as other objects and advantages thereof, will clearly appear from a description of a preferred embodiment which is shown by the accompanying drawings in which.

Figure 1:
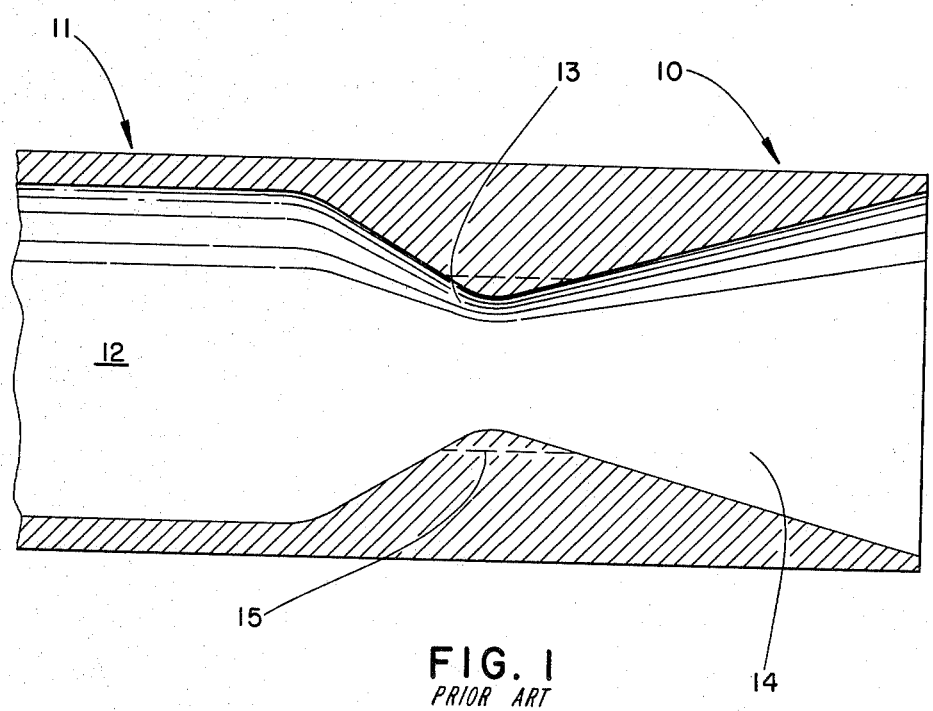
FIG. 1 is a sectional view of the aft end of a prior art rocket employing an ablation-cooled rocket nozzle of conventional design.

Referring now to the drawings by reference characters, a prior art ablation-cooled rocket nozzle 10 of conventional geometry is secured to the aft portion of a rocket motor 11 whereby high temperature affluent passes out of the combustion chamber 12 into throat portion 13 and then ejects out the nozzle cone 14 to impart thrust to the system. However, as firing continues, the ablation-cooled rocket nozzle suffers severe ablation at the throat area, causing the throat diameter to change from its original size to that indicated by dashed lines 15. This eroding away of the throat portion of the nozzle and the accompanying change in the throat area results in variations in thrust level, and, if the ablation rate is not uniform about the periphery of the throat, can produce a substantial deflection of the thrust vector throughout the firing. Consequently, not only is the efficiency of the engine substantially reduced but, in addition, accurate programming of vehicle flight becomes virtually impossible.

Figure 2:
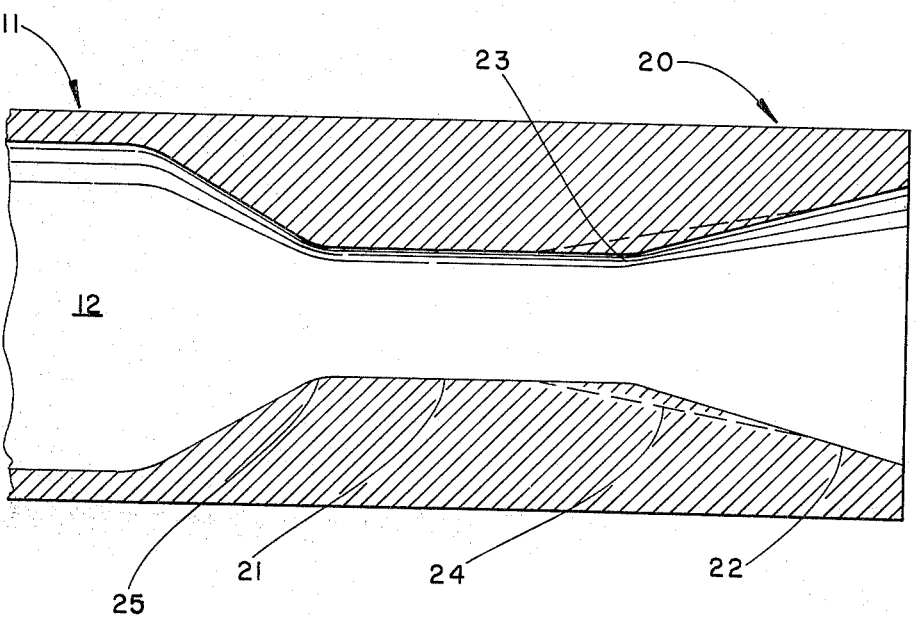
FIG. 2 is a sectional view of a rocket engine employing the ablation cooled rocket nozzle of the present invention.

Turning now to FIG. 2 wherein the ablation-cooled rocket nozzle of the present invention is shown, aft portion of rocket motor 11 is connected to nozzle portion 20. As the combustion gases are formed in combustion chamber 12, they pass through tubular rocket nozzle portion 21 and out nozzle cone portion 22 to impart the required thrust to the system. In actual operation, gas boundary build-up along the tubular portion 21 of the nozzle produces a minimum flow area in proximity to exit portion 23. Since the throat of the nozzle is considered to be at the point of minimum flow area, the throat is initially located in area 23. However, the point of maximum ablation is likewise at the throat and, as the firing progresses, aft portion 23 is ablated away down to dash lines 24. The flow area in the gas boundary layer therefore increases at area 23 causing the throat portion to migrate forward to a point somewhat in advance of area 23. Consequently, as firing progresses, the effective throat moves forward in the tubular area and, by appropriate selection of tube length and ablation materials, the effective throat will be caused to stop short of point 25 before burnout occurs. In this way the effective throat area of the nozzle is maintained substantially constant throughout the entire firing and permits accurate trajectory programming of the vehicle.

In view of the foregoing discussion, a number of possible nozzle systems embodying the concepts of the present invention will readily occur to those skilled in the art. It is evident that the length of the tubular portion 21 is dependent upon the desired firing time, gas velocities and temperatures, and the ablation characteristics of the specific material making up the nozzle. Although a large variety of materials may be employed as the ablative substance, suitable materials are a phenolic resin or an epoxy modified phenolic resin reinforced with silica or magnesia fibers.

In a specific case, when a rocket nozzle was made of Astrolite, comprised of about 30 percent phenolic resin and about 70 percent silica fiber cloth, it was found that the optimum throat length for rocket engines of moderate efficiency could be calculated as follows according to the formula:

(1) $$L = 4.26 \ln t - 46.20 \, (Pc)^{-.153}$$

where

L is the throat length in inches,
t is the operating duration in seconds, and
Pc represents chamber pressure in pounds per square inch.

The examples below show the application of this formula in determining suitable throat length.

*Example 1*

Desired:
 $Pc = 100$ p.s.i.a.
 $t = 410$ seconds.

Then:
 $L = 4.26 \ln 410 - 46.20(100)^{-.153}$
 $L = 2.75$ inches.

*Example 2*

Desired:
 $Pc = 200$ p.s.i.a.
 $t = 380$ seconds.

Then:
 $L = 4.26 \ln 380 - 46.20(200)^{-.153}$
 $L = 4.75$ inches.

It is apparent that the tubular rocket nozzle 20 of the present invention may be made in a variety of manners. For example, it may be formed from one solid piece of ablative stock, it may be formed in several sections joined together by appropriate fastening means or it may be made up of appropriate base material which is lined with ablative substances over the tubular portion or all portions of the nozzle.

It should be understood, of course, that the foregoing disclosure relates only to a preferred embodiment of the invention and that numerous modifications or alterations may be made therein without departing from the spirit and scope of the invention as set forth in the appended claims.

Having thus described the invention, what is claimed is:

1. In combination with the downstream divergent portion of an ablation-cooled rocket nozzle, an upstream throat portion having a substantially constant cross-sectional diameter for a predetermined distance along its longitudinal axis, said predetermined distance extending from a first predetermined point to a second predetermined point, and said throat portion and divergent portion being comprised of an ablative material and joining at said second predetermined point, said predetermined distance being selectively adjusted so that the preferential ablation occurring at the second predetermined point does not migrate forward to a point beyond said first predetermined point during the firing time of the rocket.

2. A rocket nozzle comprised of an elongated body of ablative material having a longitudinal axis and a longitudinal perforation along said axis with a forward portion of diameter decreasing rearwardly along said axis, a central portion of substantially constant diameter along said axis and extending for a predetermined distance from a first predetermined point to a second predetermined point, and an aft portion of diameter increasing rearwardly along said axis, said first predetermined point occurring at the juncture of said forward portion and said central portion and said second predetermined point occurring at the juncture of said aft portion and said central portion and said predetermined distance being selectively adjusted so that the preferential ablation occurring at the second predetermined point does not migrate forward to a point beyond said first predetermined point during the firing time of the rocket.

References Cited by the Examiner

UNITED STATES PATENTS

| | | | |
|---|---|---|---|
| 2,206,057 | 7/1940 | Skinner | 60—35.6 |
| 2,835,107 | 5/1958 | Ward | 60—35.6 |
| 3,048,972 | 8/1962 | Barlow | 60—35.6 |
| 3,074,585 | 1/1963 | Koontz | 60—35.6 |
| 3,081,705 | 3/1963 | Warnken | 60—35.6 |
| 3,103,784 | 9/1963 | Vetter et al. | 60—35.6 |

FOREIGN PATENTS

| | | |
|---|---|---|
| 746,214 | 3/1956 | Great Britain. |
| 399,872 | 11/1962 | Italy. |
| 125,951 | 5/1961 | Sweden. |

OTHER REFERENCES

Astrolite Products Bulletin No. PB 7-24A, Nov. 21, 1957.

Rev.: July 1, 1959 by H. I. Thompson Fiber Glass Co., pages 1-4 relied on.

MARK NEWMAN, *Primary Examiner.*

SAMUEL LEVINE, *Examiner.*